US007365938B2

(12) United States Patent
Yoo (10) Patent No.: US 7,365,938 B2
(45) Date of Patent: Apr. 29, 2008

(54) DISK DRIVE HAVING HEAT SINK DEVICE

(75) Inventor: Yong-chul Yoo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 354 days.

(21) Appl. No.: 10/902,005

(22) Filed: Jul. 30, 2004

(65) Prior Publication Data

US 2005/0041326 A1 Feb. 24, 2005

(30) Foreign Application Priority Data

Aug. 21, 2003 (KR) .................. 10-2003-0058002

(51) Int. Cl.
*G11B 17/00* (2006.01)
(52) U.S. Cl. .................. 360/97.02; 720/649
(58) Field of Classification Search ............ 360/97.02, 360/97.01, 97.04; 720/649, 648
See application file for complete search history.

(56) References Cited

U.S. PATENT DOCUMENTS

| 5,045,971 | A | * | 9/1991 | Ono et al. .................. 361/704 |
| 5,235,482 | A | * | 8/1993 | Schmitz .................. 360/97.02 |
| 6,005,768 | A | * | 12/1999 | Jo .............................. 361/685 |
| 6,320,723 | B1 | * | 11/2001 | Bernett .................... 360/97.02 |
| 6,480,382 | B2 | * | 11/2002 | Cheng ........................ 361/695 |
| 6,593,673 | B1 | * | 7/2003 | Sugai et al. ................. 307/116 |
| 6,597,531 | B2 | * | 7/2003 | Noda ........................ 360/97.01 |
| 6,687,126 | B2 | * | 2/2004 | Patel et al. .................. 361/702 |
| 6,754,041 | B2 | * | 6/2004 | Hong et al. ............... 360/97.02 |
| 6,831,833 | B2 | * | 12/2004 | Kim et al. .................... 361/690 |
| 6,880,162 | B2 | * | 4/2005 | Takagi et al. ................ 720/649 |
| 2001/0023591 | A1 | * | 9/2001 | Maeda et al. ................. 62/3.2 |
| 2001/0046119 | A1 | * | 11/2001 | Hamano et al. ............. 361/687 |

FOREIGN PATENT DOCUMENTS

| JP | 62-45797 | 3/1987 |
| JP | 11-163566 | 6/1999 |
| JP | 2000-339918 | 12/2000 |
| JP | 2001-118375 | 4/2001 |
| KR | 10-2000-0052170 | 8/2000 |
| KR | 2002-27149 | 4/2002 |

* cited by examiner

*Primary Examiner*—Brian E. Miller
*Assistant Examiner*—Matthew G. Kayrish
(74) *Attorney, Agent, or Firm*—Staas & Halsey LLP (57) ABSTRACT

A disk drive having a base member, including: a printed circuit board installed on a rear surface of the base member, on which at least one chip is mounted; a first insulation panel arranged between the base member and the printed circuit board; at least one heat conductive plate arranged between the first insulation panel and the printed circuit board to absorb and transfer heat generated by the at least one chip; and a heat dissipative plate connected to the heat conductive plate and exposed to an outside of the disk drive to dissipate the heat transferred through the heat conductive plate.

18 Claims, 7 Drawing Sheets

DISK DRIVE HAVING HEAT SINK DEVICE

CROSS REFERENCE TO RELATED APPLICATION

This application claims the priority of Korean Patent Application No. 2003-58002, filed on Aug. 21, 2003, in the Korean Intellectual Property Office, the disclosure of which is incorporated herein in its entirety by reference.

BACKGROUND OF THE INVENTION

1. Field of the Invention

The present invention relates to a disk drive, and more particularly, to a disk drive having a heat sink device to dissipate heat generated from semiconductor chips of a printed circuit board to the outside.

2. Description of the Related Art

Hard disk drives (HDDs), which are data storage devices used for computers, use read/write heads to reproduce or record data with respect to a disk. In the HDD, the read/write head performs its functions while being moved by an actuator to a desired position while lifted to a specified height from a recording surface of a rotating disk.

Figure 1:
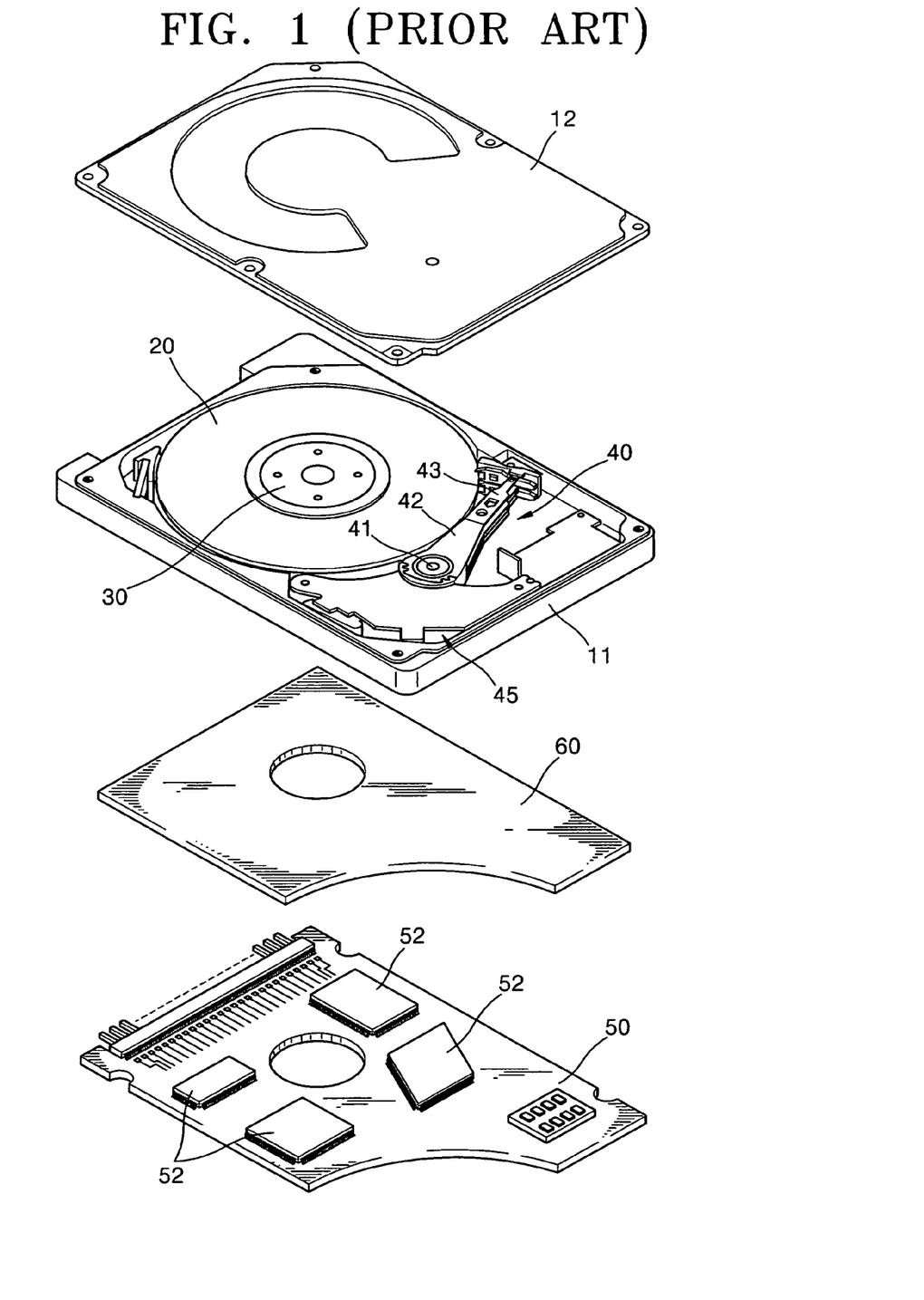
FIG. 1 is an exploded perspective view illustrating the configuration of a conventional hard disk drive.
Figure 2:
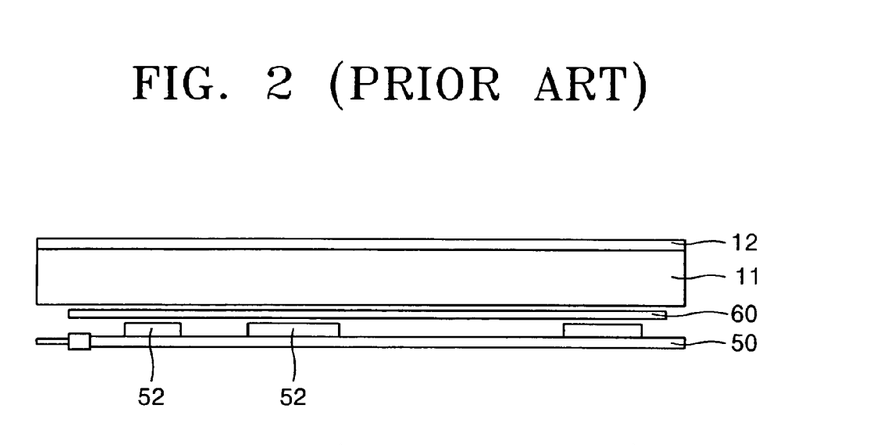
FIG. 2 is a side view of the hard disk drive of FIG. 1.

FIG. 1 is an exploded perspective view illustrating the configuration of a conventional hard disk drive. FIG. 2 is a side view illustrating the hard disk drive of FIG. 1.

Referring to FIGS. 1 and 2, a conventional hard disk drive includes a base member 11 and a cover plate 12. A spindle motor 30 to rotate a disk 20 and an actuator 40 to move a read/write head for recording and reproducing data to a desired position on the disk 20 are installed on the base member 11. The cover plate 12 is coupled to the base member 11 to protect the disk 20 and the actuator 40 by encompassing the same.

The actuator 40 includes a swing arm 42 rotatably coupled to a pivot bearing 41 installed on the base member 11, a suspension 43 installed at one end portion of the swing arm 42 and supporting a slider having the head mounted thereon toward a surface of the disk 20 to be elastically biased, and a voice coil motor (VCM) 45 to rotate the swing arm 42. The voice coil motor 45 is controlled by a servo control system to rotate the swing arm 42 in a direction following the Fleming's left hand rule by the interaction between current applied to the VCM coil and a magnetic field formed by a magnet. That is, when the power of the hard disk drive is turned on and the disk 20 starts to rotate, the voice coil motor 45 rotates the swing arm 42 counterclockwise to move the head toward a position above a recording surface of the disk 20. When the power of the hard disk drive is turned off and the disk 20 stops rotation, the voice coil motor 45 rotates the swing arm 42 clockwise so that the head is moved to a position not above the disk 20.

A printed circuit board 50 is installed on a rear surface of the base member 11. A plurality of semiconductor integrated circuit chips 52 to drive a disk drive is mounted on the printed circuit board 50. Although not shown in the drawing, a plurality of circuit devices, and wirings to electrically connect the semiconductor chips 52 and the circuit devices, are arranged on the printed circuit board 50.

A thin insulation panel 60 for insulation between the semiconductor chips 52, the circuit devices, and wirings, which are provided on the printed circuit board 50, and the base member 11, is arranged between the base member 11 and the printed circuit board 50. The insulation panel 60 is made of a material exhibiting an electric insulation feature, a thermal insulation feature, and a buffering feature so that it also has functions of insulating heat, reducing noise, and absorbing shocks and vibrations. That is, the insulation panel 60 blocks transfer of heat generated from the semiconductor chips 52 of the printed circuit board 50 into the disk drive via the base member 11.

Since the height of hard disk drives used for desktop computers is loosely restricted, the semiconductor chips can be mounted on a rear surface of the printed circuit board, that is, facing toward the outside. Thus, in this case, since the semiconductor chips are directly exposed to the outside air, the heat generated from the semiconductor chips can be easily dissipated.

However, in hard disk drives used for portable computers, for example, notebook computers, since the height thereof is tightly restricted, as shown in FIGS. 1 and 2, the semiconductor chips 52 can be mounted on an upper surface of the printed circuit board 50, that is, a surface toward the base member 11. Accordingly, the heat generated from the semiconductor chips 52 is not easily dissipated to the outside and remains between the printed circuit board 50 and the base member 11 for a long time. Although the insulation panel 60 has an insulation function, it does not dissipate the heat to the outside. As a result, after a long time of use, the heat generated from the semiconductor chips 52 is transferred to the base member 11. Accordingly, the temperature of the head, the spindle motor 30, and the actuator 40 increases so that performance of the disk drive deteriorates. Also, since the thermal conductivity coefficient of the insulation panel 60 is quite low, the heat generated from the semiconductor chips 52 cannot be distributed uniformly throughout the entire surface of the insulation panel 60. Thus, a rise in the temperature of the base member 11 at a portion near the semiconductor chips 52 generating a large amount of heat is relatively great. As the rise in the temperature differs according to the portions of the base member 11, the base member 11 is deformed so that the entire configuration of the disk drive is deformed and thus performance thereof may be deteriorated.

Figure 3:
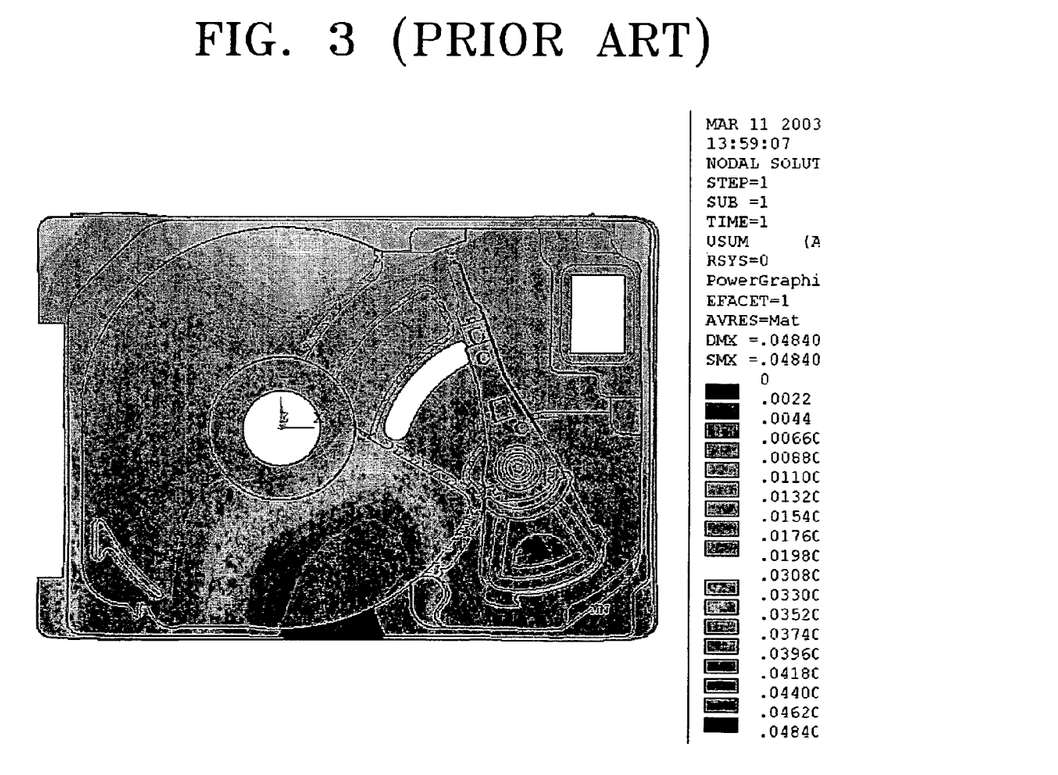
FIG. 3 is a view showing the deformation of the base member due to the heat generated from the semiconductor chips in the conventional hard disk drive shown in FIG. 1.

FIG. 3 shows that there is a considerable difference in the amount of deformation according to the portions of the base member due to the local temperature rise in the base member by the heat generated from the semiconductor chips in the conventional hard disk drive shown in FIG. 1.

BRIEF SUMMARY

To solve the above and/or other problems, the present invention provides a disk drive having a heat sink device capable of easily dissipating heat generated from the semiconductor chips of the printed circuit board to the outside, to prevent deformation of the base member and deterioration of performance by the heat.

According to an aspect of the present invention, there is provided a disk drive having base member, including: a printed circuit board installed on a rear surface of the base member, on which at least one chip is mounted; a first insulation panel arranged between the base member and the printed circuit board; at least one heat conductive plate arranged between the first insulation panel and the printed circuit board to absorb and transfer heat generated by the at least one chip by contacting a surface of at least one chip; and a heat dissipative plate connected to the heat conductive plate and exposed to an outside of the disk drive to dissipate the heat transferred through the heat conductive plate.

The at least one chip may be more than one, and a heat conductive plate may be connected to a heat dissipative plate and may be provided for each chip.

The heat conductive plate may substantially cover the entire an upper surface of the printed circuit board opposite the rear surface.

A second insulation panel may be arranged between each of the heat conductive plates and the printed circuit board. At least one insertion hole, in which the chip is inserted, may be formed in the second insulation panel and the heat conductive plate may contact the at least one chip through the at least one insertion hole. The first insulation panel and the second insulation panel may be attached to sides of each heat conductive plate.

The heat dissipative plate may be exposed from a side surface of the disk drive. The heat dissipative plate may extend vertically from an edge portion of each heat conductive plate.

Each heat dissipative plate may be arranged on a rear surface of the printed circuit board and each heat conductive plate and the heat sink plate are connected by a connection member. A connection hole may be formed in the printed circuit board and the connection member may be disposed in the connection hole.

According to another aspect of the present invention, there is provided a disk drive having a base member, including: a printed circuit board having at least one chip; a first insulation panel arranged between the base member and the printed circuit board; and a heat sink which absorbs and dissipates heat generated by the at least one chip, the heat sink including a first portion disposed between the printed circuit board and the insulation panel to absorb heat and a second portion connected to the first portion and exposed to an outside of the disk drive to dissipate the absorbed heat.

According to yet another aspect of the present invention, there is provided a disk drive having a base member, including: a printed circuit board having at least one chip; a first insulation panel disposed between the base member and the printed circuit board; a second insulation panel disposed between the first insulation panel and the printed circuit board, the second insulation panel having at least one insertion hole, one for each chip, to accommodate the at least one chip; and a heat sink disposed between the insulation panels and which absorbs and dissipates heat generated by the at least one chip, the heat sink including a first portion to absorb heat and a second portion connected to the first portion to dissipate the absorbed heat.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 4:
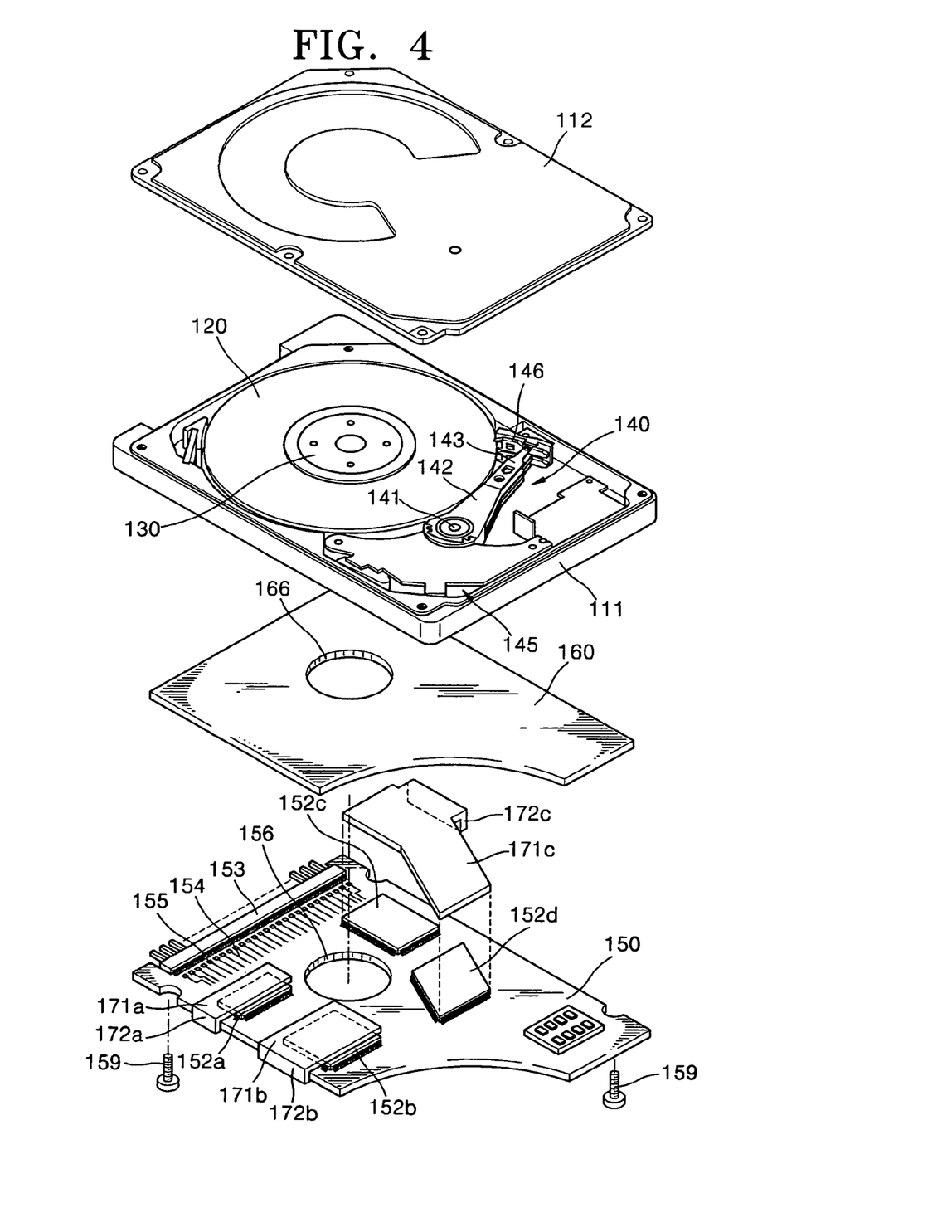
FIG. 4 is an exploded perspective view illustrating a hard disk drive having a heat sink device according to a first embodiment of the present invention.
Figure 5:
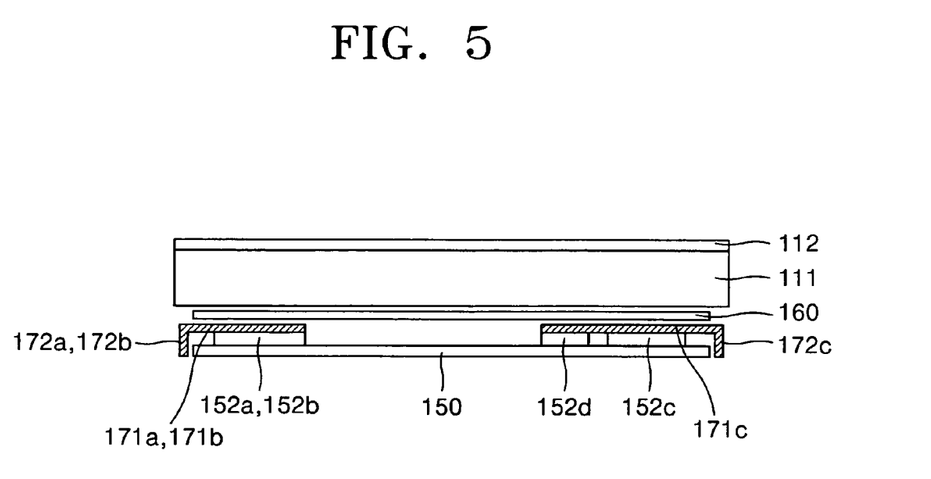
FIG. 5 is a side view the hard disk drive of FIG. 4.

Referring to FIGS. 4 and 5, a hard disk drive according to a first embodiment of the present invention includes a spindle motor 130 to rotate a disk 120, an actuator 140, a printed circuit board 150 on which a plurality of semiconductor chips 152a, 152b, 152c, and 152d are mounted, a first insulation panel 160, and a heat sink device to dissipate heat generated from the semiconductor chips 152a, 152b, 152c, and 152d to the outside.

The spindle motor 130 is installed on a base member 111 of the hard disk drive. At least one disk 120 is installed on a hub of the spindle motor 130 and rotated with the hub.

The actuator 140 moves a read/write head for recording and reproducing data to a specified position on the disk 120, and includes a swing arm 142, a suspension 143, and a voice coil motor 145. The swing arm 142 is rotatably coupled to a pivot bearing 141 installed on the base member 111. The suspension 143 is coupled to a leading end portion of the swing arm 142 and supports and elastically biases a slider, on which the head is mounted, toward a surface of the disk 120.

The voice coil motor 145 provides a drive force to rotate the swing arm 142 and is controlled by a servo control system to rotate the swing arm 142 in a direction following the Fleming's left hand rule by the interaction between current applied to a VCM coil and a magnetic field formed by a magnet. That is, when the power of the disk drive is on and the disk 120 starts to rotate, the voice coil motor 145 rotates the swing arm 142 counterclockwise so that the head is moved to the recording surface of the disk 120. In contrast, when the power of the disk drive is off and the rotation of the disk 120 stops, the voice coil motor 145 rotates the swing arm 142 clockwise so that the head escapes the disk 120. The head escaped the recording surface of the disk 120 is parked on a ramp 146 provided outside the disk 120.

The disk 120, the spindle motor 130, and the actuator 140 are protected by a cover plate 112 coupled to an upper portion of the base member 111.

The printed circuit board 150 is installed on the rear surface of the base member 111. A plurality of semiconductor integrated circuit chips 152a, 152b, 152c, and 152d to drive the disk drive are mounted on an upper surface of the printed circuit board 150 which faces the base member 111. A plurality of circuit devices 155 and wirings 154 are arranged on the upper surface of the printed circuit board 150. A connector 153 for electric connection with a main circuit board of a computer main body is provided at one side of the printed circuit board 150. The printed circuit board 150 is coupled to the base member 111 by using a plurality of screws 159.

The first insulation panel 160 is disposed between the base member 111 and the printed circuit board 150 and electrically insulates the semiconductor integrated circuit chips 152*a*, 152*b*, 152*c*, and 152*d*, the circuit devices 155, and the wirings 154, from the base member 111. Also, the first insulation panel 160 has a thermal insulation function to block the transfer of the heat generated from the semiconductor integrated circuit chips 152*a*, 152*b*, 152*c*, and 152*d* of the printed circuit board 150 to the base member 111.

Reference numerals 156 and 166 indicate openings formed in the printed circuit board 150 and the first insulation panel 160, respectively, to insert a lower portion of the spindle motor 130.

The heat sink device, which is a characteristic feature of the present invention, includes heat conductive plates 171*a*, 171*b*, and 171*c* and heat dissipative plates 172*a*, 172*b*, 172*c*. The heat conductive plates 171*a*, 171*b*, and 171*c* and the heat dissipative plates 172*a*, 172*b*, 172*c* are formed of a metal having a high thermal conductivity coefficient, such as, for example, aluminum or an aluminum alloy.

The heat conductive plates 171*a*, 171*b*, and 171*c* are arranged between the first insulation panel 160 and the printed circuit board 150 to respectively contact the surfaces of the semiconductor chips 152*a*, 152*b*, 152*c*, and 152*d*. The heat conductive plates 171*a*, 171*b*, and 171*c* contact the surfaces of the semiconductor chips 152*a*, 152*b*, 152*c*, and 152*d* as much as possible. Since the heat conductive plates 171*a*, 171*b*, and 171*c* are formed of the metal having a high thermal conductivity coefficient, they absorb the heat generated from the semiconductor chips 152*a*, 152*b*, 152*c*, and 152*d* well. The absorbed heat is transferred to the heat dissipative plates 172*a*, 172*b*, and 172*c*.

The heat dissipative plates 172*a*, 172*b*, and 172*c* having the above function may have different shapes according to the number of the semiconductor chips 152*a*, 152*b*, 152*c*, and 152*d* and the positions thereof. For example, as shown in the drawings, the thermal conductive plates 171*a* and 171*b* are formable to contact the semiconductor chips 152*a* and 152*b* and the other thermal conductive plate 171*c* is formable to contact the surfaces of the two semiconductor chips 152*c* and 152*d*.

The heat dissipative plates 172*a*, 172*b*, and 172*c* are connected to the heat conductive plates 171*a*, 171*b*, and 171*c*, respectively, and exposed to the outside of the disk drive. In detail, the heat dissipative plates 172*a*, 172*b*, and 172*c* are formable by vertically extending from one sides of the heat conductive plates 171*a*, 171*b*, and 171*c*, respectively, to be exposed from the side surface of the disk drive. The heat dissipative plates 172*a*, 172*b*, and 172*c* are formed as large as possible within a range to not interfere with other constituent elements so that a larger heat sink area can be obtained. According to the above configuration, the heat dissipative plates 172*a*, 172*b*, and 172*c* directly contact the outside air, the heat transferred through the heat conductive plates 171*a*, 171*b*, and 171*c* is dissipated to the outside.

According to the above-described embodiment of the present invention, since the heat generated from the semiconductor chips 152*a*, 152*b*, 152*c*, and 152*d* of the printed circuit board 150 is easily and rapidly dissipated to the outside through the heat dissipative plates 172*a*, 172*b*, and 172*c* and the heat conductive plates 171*a*, 171*b*, and 171*c* which are mostly formed of metal, heat is hardly accumulated between the printed circuit board 150 and the first insulation panel 160. Also, most heat transferred toward the base member 111 from the semiconductor chips 152*a*, 152*b*, 152*c*, and 152*d* and the heat conductive plates 171*a*, 171*b*, and 171*c* is blocked by the fist insulation panel 160. Therefore, the deformation of the base member 111 due to the local temperature rise, the deterioration of performance of the disk drive due to the temperature rise, and the damage to the semiconductor chips 152*a*, 152*b*, 152*c*, and 152*d* due to the overheat can be prevented.

Figure 6:
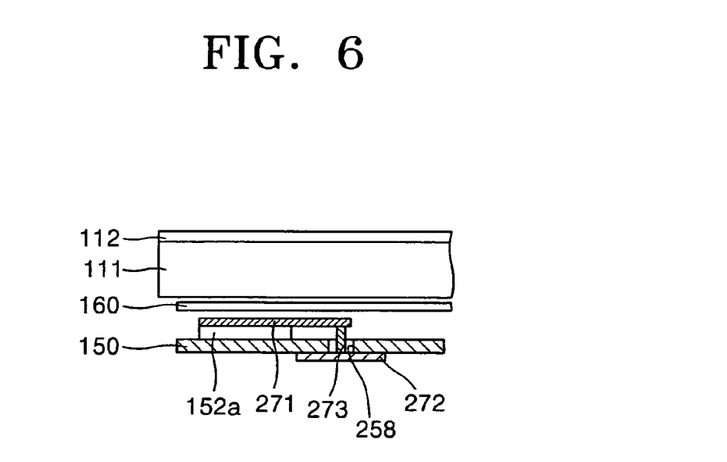
FIG. 6 is a side view illustrating part of a hard disk drive having a heat sink device according to a second embodiment of the present invention.

FIG. 6 shows a hard disk drive having a heat sink device according to a second embodiment of the present invention.

Referring to FIG. 6, in a disk drive according to a second embodiment of the present invention, a heat sink device to dissipate the heat generated from the semiconductor chip 152*a* to the outside includes a heat conductive plate 271 arranged between the first insulation panel 160 and the printed circuit board 150 and contacting the surface of each of the semiconductor chip 152*a* and a heat dissipative plate 272 arranged on the rear surface of the printed circuit board 150 to dissipate the heat transferred through the heat conductive plate 271 to the outside. The heat sink device having the above configuration is appropriate for, for example, a case in which the heat dissipative plate 272 is not arrangeable on the side surface of the disk drive.

Since the configuration of the heat conductive plate 271 is the same as that of the heat conductive plate 171*a*, 171*b*, 171*c*, and 171*d*, a detailed description thereof is omitted.

The heat dissipative plate 272 is arranged on the rear surface of the printed circuit board 150 and exposed to the outside of the disk drive, unlike the first embodiment. The heat dissipative plate 272 is connected to the heat conductive plate 271 by a connection member 273. To this end, a connection hole 258 is formed on the printed circuit board 150. As the connection member 273 is inserted in the connection hole 258, the heat conductive plate 271 arranged on the upper side of the printed circuit board 150 and the heat dissipative plate 272 arranged on the lower side of the printed circuit board 150 are connectable to each other by the connection member 273. The connection hole 258 and the heat dissipative plate 272 are provided at an empty space of the printed circuit board 150, that is, a portion where the semiconductor chip 152*a*, the circuit devices, and the wirings are not arranged. It is contemplated that a plurality of the connection holes and heat dissipative plates may be provided. The connection member 273 may be formed of metal exhibiting a high thermal conductivity coefficient such as, for example, aluminum or an aluminum alloy.

In operation, the heat generated from the semiconductor chip 152*a* is absorbed by the heat conductive plate 271, transferred to the heat dissipative plate 272 through the heat conductive plate 271 and the connection member 273, and dissipated to the outside from the heat dissipative plate 272 contacting the outside air. Thus, a similar effect as in the first embodiment is obtained in the second embodiment.

Figure 7:
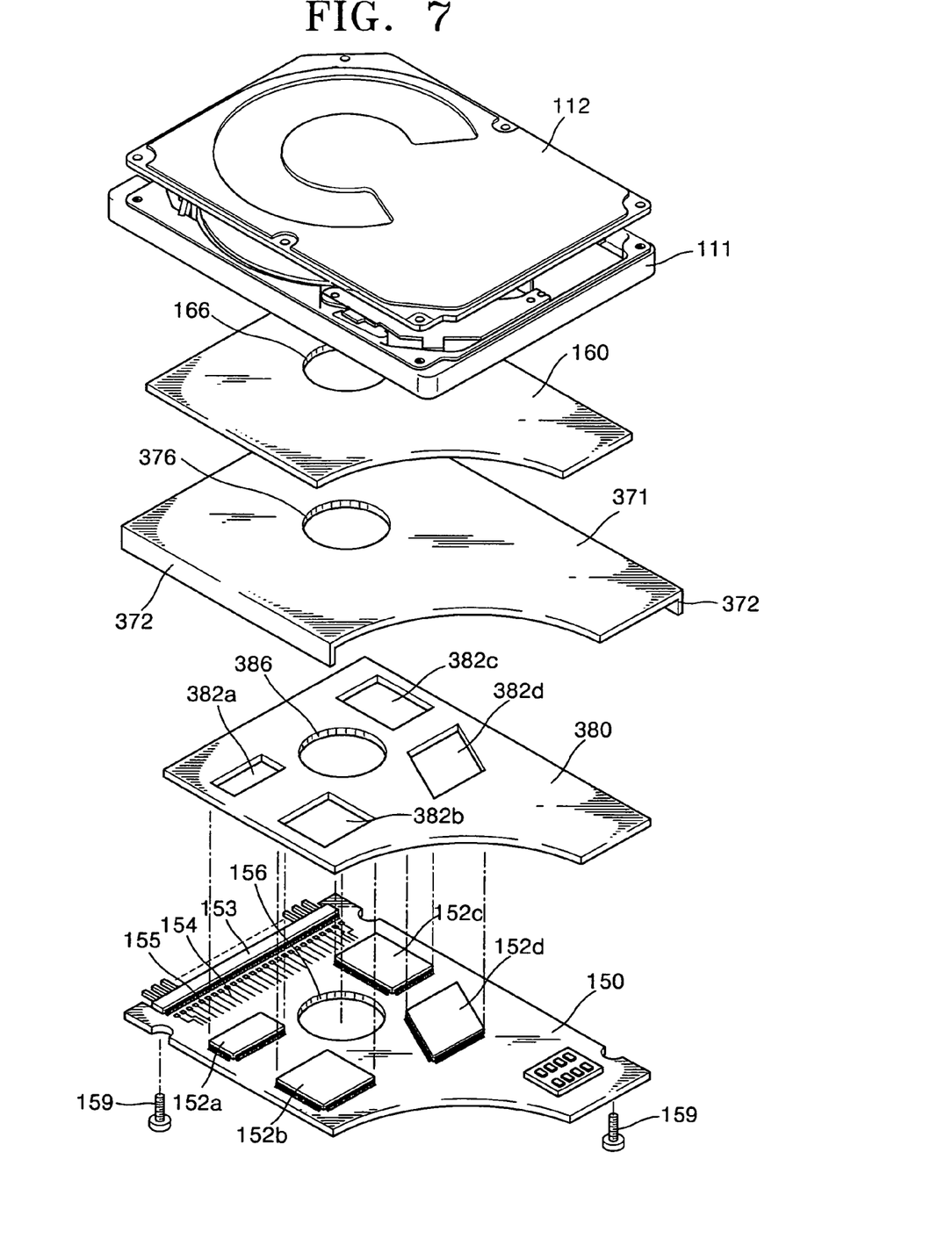
FIG. 7 is an exploded perspective view illustrating part of a hard disk drive having a heat sink device according to a third embodiment of the present invention.
Figure 8:
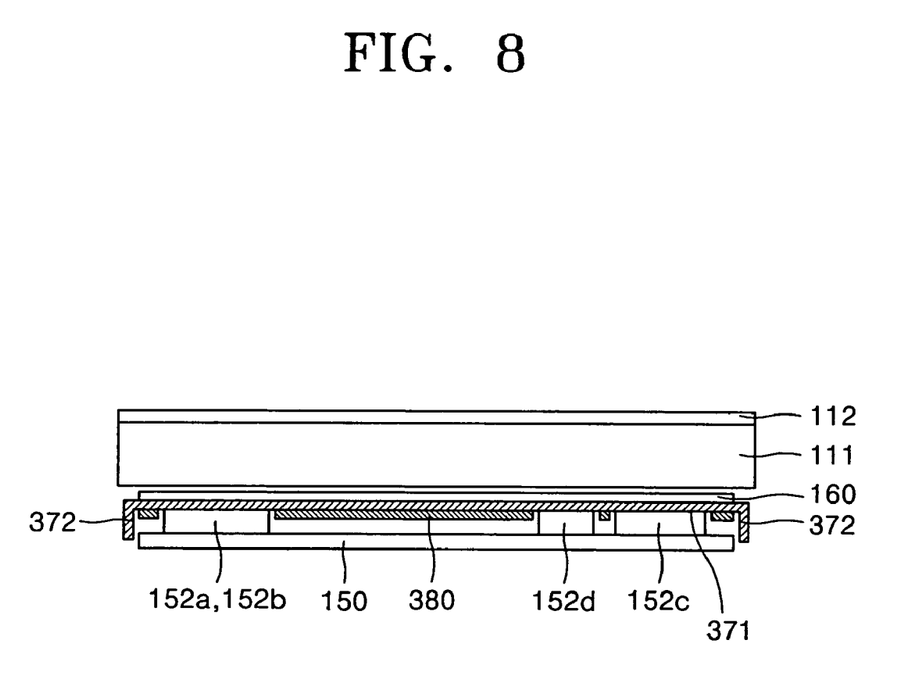
FIG. 8 is a side view of the hard disk drive of FIG. 7.

FIG. 7 is an exploded perspective view illustrating part of a hard disk drive having a heat sink device according to a third embodiment of the present invention. FIG. 8 is a side view of the hard disk drive of FIG. 7.

Referring to FIGS. 7 and 8, a heat sink device of a disk drive according to a third embodiment of the present invention includes a heat conductive plate 371 to absorb and transfer heat generated from the semiconductor chips 152*a*, 152*b*, 152*c*, and 152*d* of the printed circuit board 150 and a heat dissipative plate 372 to dissipate the heat transferred from the heat conductive plate 371 to the outside.

The heat conductive plate 371 is arranged between the first insulation panel 160 and the printed circuit board 150 and contacts the surfaces of the semiconductor chips 152a, 152b, 152c, and 152d mounted on the upper surface of the printed circuit board 150. In the present embodiment, the heat conductive plate 371 is substantially formed to cover the entire upper surface of the printed circuit board 150. The heat conductive plate 371 is formed of metal exhibiting a high thermal conductivity coefficient such as, for example, aluminum or an aluminum alloy as in the previous embodiments. According to the heat conductive plate 371 which is large, the heat absorbed from the semiconductor chips 152a, 152b, 152c, and 152d can be rapidly and uniformly distributed in a large area. Thus, the heat transferred to the base member 111 is uniformly distributed in a large area so that deformation of the base member 111 due to the irregular distribution of the temperature can be prevented.

An opening 376 is formed in the heat conductive plate 371 to correspond to the opening 156.

The heat dissipative plate 372 is connected to the heat conductive plate 371 and exposed to the outside of the disk drive. In detail, the heat dissipative plate 372 vertically extends from both side edges of the heat conductive plate 371 so as to be exposed from the side surface of the disk drive. Thus, since the heat dissipative plate 372 directly contacts the outside air, the heat transferred through the heat conductive plate 371 is dissipated to the outside.

The heat dissipative plate 372 is arrangeable on the rear surface of the printed circuit board 150 and connected to the heat conductive plate 371 by an additional connection member, as shown in FIG. 6.

A second insulation panel 380 is arranged between the heat conductive plate 371 and the printed circuit board 150. The second insulation panel 380 performs electrical insulation between the heat conductive plate 371 and the circuit devices 155 and the wirings 154 on the printed circuit board 150. A plurality of insertion holes 382a, 382b, 382c, and 382d are formed at positions corresponding to the semiconductor chips 152a, 152b, 152c, and 152d so that the heat conductive plate 371 can contact the surfaces of the semiconductor chips 152a, 152b, 152c, and 152d. The semiconductor chips 152a, 152b, 152c, and 152d are inserted in the insertion holes 382a, 382b, 382c, and 382d, respectively, so that the heat conductive plate 371 can directly contact the surface of each of the semiconductor chips 152a, 152b, 152c, and 152d. An opening 386 is formed in the second insulation panel 380 to correspond to the opening 156 of the printed circuit board 150.

The first insulation panel 160, the heat conductive plate 371, and the second insulation panel 380 can be separately assembled between the base member 111 and the printed circuit board 150. The first insulation panel 160 and the second insulation panel 380 are attached to both sides of the heat conductive plate 371 by using an adhesive. Accordingly, since the firs insulation panel 160, the heat conducive plate 371, and the second insulation panel 380 can be integrally handled, assembly thereof is convenient.

Figure 9:
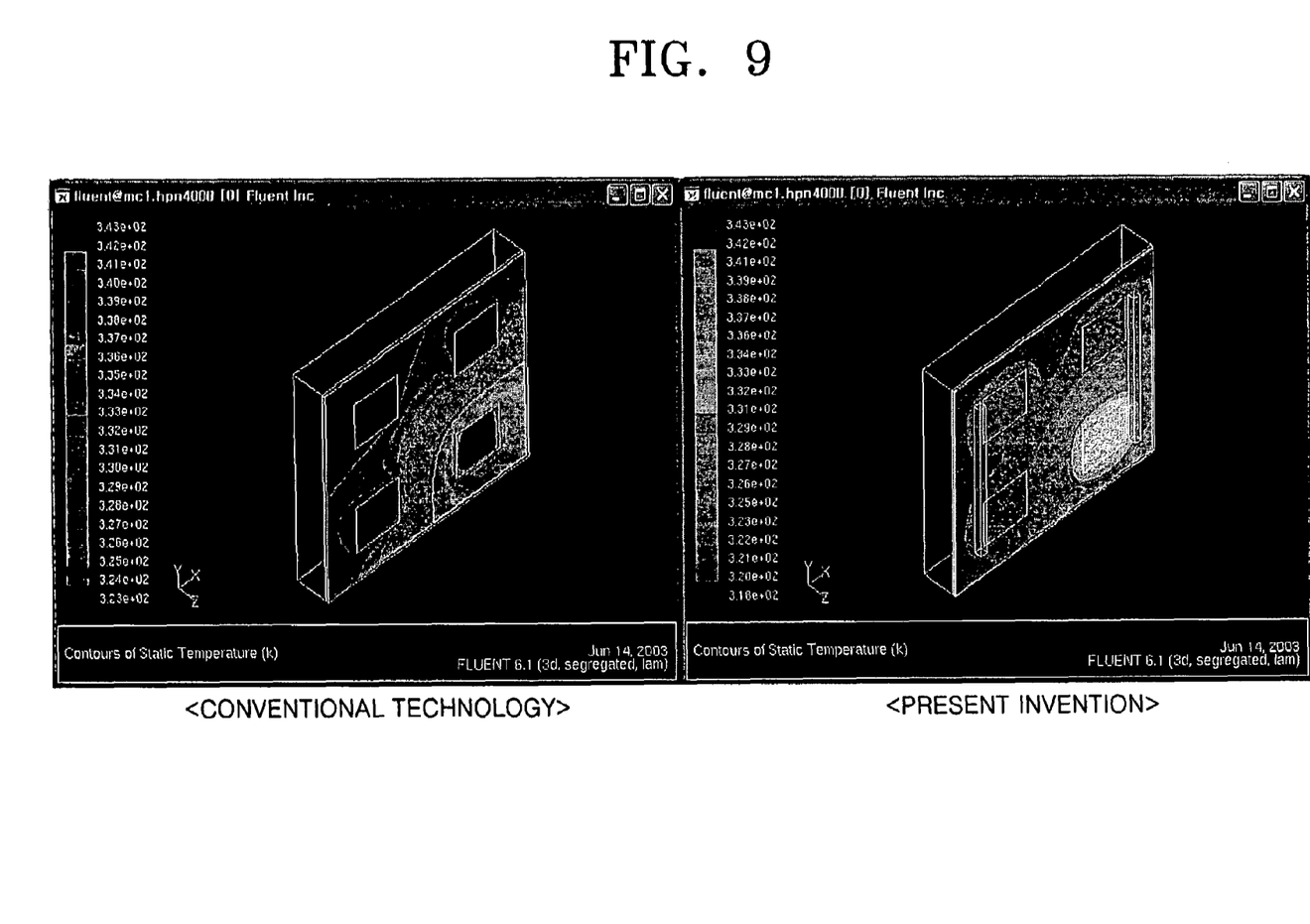
FIG. 9 is a view showing the result of simulation of the distribution of temperature on the rear surface of the base member by the heat generated from the semiconductor chips in the disk drive according to the third embodiment of FIG. 7 and the conventional disk drive.

FIG. 9 is a view showing the result of simulation of the distribution of temperature on the rear surface of the base member by the heat generated from the semiconductor chips in the disk drive according to the third embodiment of FIG. 7 and the conventional disk drive.

Referring to FIG. 9, when most heat is generated from one of the semiconductor chips, according to the conventional technology, the temperature of a portion of the base member close to the semiconductor chip which generates most of heat rises so that the distribution of temperature of the base member becomes very irregular. However, according to the disclosed embodiments of the present invention, the temperature of the portion of the base member close to the semiconductor chip which generating most of heat is much lower than that according to the conventional technology. Furthermore, the distribution of temperature in the base member becomes uniform compared to the conventional technology.

As described above, according to the disclosed embodiments of the present invention, the heat generated from the semiconductor chips of the printed circuit board is dissipated to the outside of the disk drive through the heat conductive plate and the heat dissipative plate which are formed of metal. Thus, the deterioration of performance of the disk drive due to the increase in temperature and the damage to the semiconductor chips due to the overheat can be prevented.

Moreover, by forming the heat conductive plate large, the heat transferred to the base member is uniformly distributed in a large area so that the deformation of the base member due to the irregular distribution of temperature can be prevented.

Although a few embodiments of the present invention have been shown and described, the present invention is not limited to the described embodiments. Instead, it would be greatly appreciated by those skilled in the art that changes may be made in these embodiments without departing from the principles and spirit of the invention, the scope of which is defined by the claims and their equivalents.

What is claimed is:

1. A disk drive having a base member, comprising:
   a printed circuit board installed on a rear surface of the base member, on which at least one chip is mounted;
   a first insulation panel arranged between the base member and the printed circuit board;
   at least one heat conductive plate arranged between the first insulation panel and the printed circuit board to absorb and transfer heat generated by the at least one chip; and
   a heat dissipative plate connected to the heat conductive plate and exposed to an outside of the disk drive to dissipate the heat transferred through the heat conductive plate;
   wherein the heat dissipative plate extends vertically from an edge portion of the at least one heat conductive plate over an edge of the printed circuit board, preventing contact with the circuit board.

2. The disk drive as claimed in claim 1, wherein the at least one chip is more than one, and wherein a heat conductive plate connected to a heat dissipative plate is provided for each of the chips.

3. The disk drive as claimed in claim 1, wherein the at least one heat conductive plate substantially covers an upper surface of the printed circuit board opposite the rear surface.

4. The disk drive as claimed in claim 3, further comprising a second insulation panel arranged between each of the heat conductive plates and the printed circuit board.

5. The disk drive as claimed in claim 4, wherein at least one insertion hole, in which the chip is inserted, is formed in the second insulation panel and each heat conductive plate contacts the at least one chip through the at least one insertion hole.

6. The disk drive as claimed in claim 4, wherein the first insulation panel and the second insulation panel are attached to sides of each heat conductive plate.

7. The disk drive as claimed in claim 1, wherein the heat dissipative plate is exposed from a side surface of the disk drive.

8. The disk drive as claimed in claim 1, wherein the at least one heat conductive plate and the dissipative plate is made of a metal having a high thermal conductivity coefficient.

9. The disk drive as claimed in claim 1, wherein the first portion contacts a surface of the at least one chip.

10. A disk drive having a base member, comprising:
a printed circuit board installed on a rear surface of the base member, on which at least one chip is mounted;
a first insulation panel arranged between the base member and the printed circuit board;
at least one heat conductive plate arranged between the first insulation panel and the printed circuit board to absorb and transfer heat generated by the at least one chip; and
a heat dissipative plate connected to the heat conductive plate and exposed to an outside of the disk drive to dissipate the heat transferred through the heat conductive plate,
wherein the heat dissipative plate is arranged on a rear surface of the printed circuit board and the at least one heat conductive plate and the heat dissipative plate are connected by a connection member, and
wherein a connection hole is formed in the printed circuit board and the connection member is disposed in the connection hole.

11. The disk drive as claimed in claim 10, wherein the connection hole is formed in the printed circuit board, and the connection hole and the heat dissipative plate are located at an empty space of the circuit board.

12. A disk drive having a base member, comprising:
a printed circuit board having at least one chip;
a first insulation panel arranged between the base member and the printed circuit board; and
a heat sink which absorbs and dissipates heat generated by the at least one chip, the heat sink including a first portion disposed between the printed circuit board and the insulation panel to absorb heat and a second portion connected to the first portion and exposed to an outside of the disk drive to dissipate the absorbed heat,
wherein the second portion extends vertically from an edge portion of the first portion over an edge of the printed circuit board, preventing contact with the circuit board.

13. The disk drive as claimed in claim 12, wherein the first portion contacts a surface of the at least one chip.

14. A disk drive having a base member, comprising:
a printed circuit board having at least one chip;
a first insulation panel arranged between the base member and the printed circuit board; and
a heat sink which absorbs and dissipates heat generated by the at least one chip, the heat sink including a first portion disposed between the printed circuit board and the insulation panel to absorb heat and a second portion connected to the first portion and exposed to an outside of the disk drive to dissipate the absorbed heat,
wherein the at least one chip is on a first side of the printed circuit board, the second portion is on a second side of the printed circuit board, and the heat sink includes a connecting portion which connects the first and second portions and extends through the printed circuit board.

15. A disk drive having a base member, comprising:
a printed circuit board having at least one chip;
a first insulation panel disposed between the base member and the printed circuit board;
a second insulation panel disposed between the first insulation panel and the printed circuit board, the second insulation panel having at least one insertion hole, one for each chip, to accommodate the at least one chip; and
a heat sink disposed between the insulation panels and which absorbs and dissipates heat generated by the at least one chip, the heat sink including a first portion to absorb heat and a second portion connected to the first portion to dissipate the absorbed heat, the second portion vertically extending from side edges of the first portion over an edge of the printed circuit board, so as to be exposed from the side surface of the disk drive to directly contact outside air.

16. The disk drive as claimed in claim 15, wherein the first portion extends over substantially all of a surface of the printed circuit board.

17. The disk drive as claimed in claim 15, wherein the second portion is exposed to an outside of the disk drive.

18. The disk drive as claimed in claim 15, wherein the first portion contacts a surface of the at least one chip.

* * * * *